US012492787B2

(12) United States Patent
Van De Sluis et al.

(10) Patent No.: US 12,492,787 B2
(45) Date of Patent: Dec. 9, 2025

(54) ARTIFICIAL SKYLIGHT

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Michel Cornelis Josephus Marie Vissenberg, Roermond (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/692,006

(22) PCT Filed: Sep. 16, 2022

(86) PCT No.: PCT/EP2022/075814

§ 371 (c)(1),
(2) Date: Mar. 14, 2024

(87) PCT Pub. No.: WO2023/041728

PCT Pub. Date: Mar. 23, 2023

(65) Prior Publication Data

US 2024/0377039 A1 Nov. 14, 2024

(30) Foreign Application Priority Data

Sep. 20, 2021 (EP) .................................... 21197692

(51) Int. Cl.
*F21S 8/02* (2006.01)
*F21V 7/00* (2006.01)
(Continued)

(52) U.S. Cl.
CPC ............ *F21S 8/026* (2013.01); *F21V 7/0008* (2013.01); *F21V 9/02* (2013.01); *F21Y 2103/00* (2013.01); *F21Y 2113/10* (2016.08)

(58) Field of Classification Search
CPC ........... F21S 8/026; F21V 7/0008; F21V 9/02
See application file for complete search history.

(56) References Cited

U.S. PATENT DOCUMENTS 10,151,442 B2 * 12/2018 Takeshita .............. F21V 7/0008
10,352,534 B2 7/2019 Di Trapani
(Continued)

FOREIGN PATENT DOCUMENTS

JP 2019129082 A 8/2019
WO 2017084756 A1 5/2017
WO 2019212025 A1 11/2019

*Primary Examiner* — Christopher E Dunay

(57) ABSTRACT

Artificial skylight (1000) comprising an elongated light source (1) accommodated in an elongated light box (5) comprising a base wall (7) and a light exit window (9) mutually connected by a circumferential side wall (11). The light source issues light source light (17) into the cavity of the elongated light box, said light source light subsequently is issued from the cavity through the light exit window as light box light (19), which comprises a portion of directed, collimated light (19*a*) and a portion of diffused light (19*b*). The collimated light has a beam angle α in a transverse direction T, wherein α is only determined by the mutual positions of the light source and a first (15*a*) and a second baffle (15*b*) comprised in the artificial skylight. Said first baffle is arranged closer to the light source than said second baffle, and the light source is offset in the transverse direction such to screen it from a direct view.

14 Claims, 8 Drawing Sheets

(51) Int. Cl.

| | |
|---|---|
| ***F21V 9/02*** | (2018.01) |
| *F21Y 103/00* | (2016.01) |
| *F21Y 113/10* | (2016.01) |

(56) References Cited

U.S. PATENT DOCUMENTS

| | | | | |
|---|---|---|---|---|
| 11,209,138 | B2 * | 12/2021 | Keller | F21V 23/003 |
| 2014/0133125 | A1 | 5/2014 | Di Trapani et al. | |
| 2016/0102843 | A1 | 4/2016 | Onac et al. | |
| 2018/0017233 | A1 | 1/2018 | Takeshita | |
| 2018/0098399 | A1 | 4/2018 | Takeshita et al. | |
| 2023/0265988 | A1 * | 8/2023 | Gantenbrink | F21V 11/00<br>362/235 |
| 2023/0341107 | A1 * | 10/2023 | Di Trapani | F21V 13/12 |
| 2024/0142085 | A1 * | 5/2024 | Pickard | F21S 8/006 |
| 2024/0318796 | A1 * | 9/2024 | Van Delden | F21S 8/026 |

* cited by examiner

ARTIFICIAL SKYLIGHT

CROSS-REFERENCE TO PRIOR APPLICATIONS

This application is the U.S. National Phase application under 35 U.S.C. § 371 of International Application No. PCT/EP2022/075814, filed on Sep. 16, 2022, which claims the benefit of European Patent Application No. 21197692.3, filed on Sep. 20, 2021. These applications are hereby incorporated by reference herein.

TECHNICAL FIELD

The present invention is related to an artificial skylight for obtaining an artificial skylight/daylight or a natural window appearance.

BACKGROUND

There is of interest to people to receive daylight, due to it being important for their health and well-being. However, people tend to spend more and more of their time indoors, which may remove them from natural daylight. Therefore, there is an interest in creating artificial light, which may simulate the appearance and light of a natural window or skylight. In order to emulate daylight and skylight more faithfully, one has to emulate sunlight. This has mainly been done by providing an artificial daylight or skylight which emits blue light (i.e. clear sky) when viewed from an angle, while still providing a predominantly white light beam directed substantially perpendicular to the exit window of the daylight or skylight. An example of a lighting system that simulates natural lighting is shown in US2014133125. The shown lighting system comprises a bright light hidden in a space above a false ceiling, wherein the light emits a directional beam of light which shines through an exit window that contains an optical element for affecting the beam shape. A drawback with such a system is that the light source must be much smaller than the exit window in order to create a sharply defined beam of artificial sunlight, but at the same time the source must produce a very high flux in order to create a convincing sunlight beam effect. Thus, a very compact and extremely bright light source is needed, which is very costly. Further, high costs and installation complexity are main issues for the known, current daylight experience solutions, for example such as offered by Coelux.

US2018098399A1 discloses a lighting apparatus capable of emitting light imitating the sky in nature.

SUMMARY

In view of the above discussion, a concern of the present invention is to provide a relatively simple and cheap artificial skylight which can deliver a convincing sunlight beam effect. It is further a concern of the present invention to provide an artificial skylight which can imitate a skylight or a natural window whilst providing a relatively easy and compact installation, and/or which may entail reduced requirement of a false ceiling/wall.

To address at least one of these concerns and other concerns, an artificial skylight in accordance with the independent claim is provided. Preferred embodiments are defined by the dependent claims. According to a first aspect of the present invention, an artificial skylight is provided comprising:

an elongated light source having a longitudinal axis;

an elongated light box comprising a base wall and oppositely arranged thereto a light exit window mutually connected by a circumferential side wall of the light box, said base wall and said side wall defining a cavity accommodating the light source, said circumferential side wall comprising a first and second elongated, mutually opposed wall and extending along the longitudinal axis from a first end wall to an opposed second end wall of the circumferential side wall;

a first and second baffle extending along the longitudinal axis;

wherein the light source is configured to issue light source light into the cavity of the elongated light box, said light source light subsequently is to be issued from the cavity through the light exit window of the light box as light box light to the exterior, said light box light comprising a portion of directed, collimated light and a portion of diffused light, wherein the collimated light has a beam angle $\alpha$ in a transverse direction T transverse to the longitudinal axis, which beam angle $\alpha$ is only determined by the mutual positions of the light source and the first and second baffle, wherein the first baffle is arranged closer to the light source than the second baffle, and wherein the light source is offset in the transverse direction such that in a direction P perpendicular to the light exit window the light source is screened from a direct view.

The artificial skylight alternatively can function as a natural window and can conveniently be mounted in a ceiling of a room relatively close to a wall of said room, for example at an average distance from said room wall at one third of the height of said room, for convenient projection of the directed, collimated light on said wall of said room. Furthermore, such a position with respect to said wall of said room renders that a person is not likely to be able to look into the cavity and to directly see the light source. The artificial skylight is elongated and has a length, a width, and a longitudinal axis. The longitudinal axis is an axis that is oriented along the length of the elongated light source of the artificial skylight and is also referred to as longitudinal direction or length direction.

The artificial skylight comprises a cavity. The cavity may be defined by an interior surface configured to (diffusely) reflect light impinging upon the interior surface of the cavity and have a light exit window permitting light inside the cavity to exit the cavity. The light exit window is free from expensive optical elements, like a translucent plate, diffuser, refractive lenses, diffractive optical elements, or reflective optical elements such as reflector cups such that at least part of the light box light can be issued from the cavity to the exterior without passing through such optical element. Instead the cavity has two, relatively cheap, elongated baffles as beam-delimiting elements, each being arranged at or relatively close to the light exit window and at different distances from the elongated, linear light source, to produce edges of the skylight projected image at different heights on the wall, with the top edge of the projected image being sharper than the bottom edge of the projected image. Note that the expressions "top" and "bottom" are related to the direction of gravity. The feature of a sharp top edge and a less sharp bottom edge of the projected image contributes to the convincing sunlight beam effect. Yet, it may be the case that the first baffle arranged at the first elongated wall of the light box is extended with a transparent plate extending to the second elongated wall of the light box, thus reducing the risk of contamination of the (walls) of the cavity that may involve efficiency loss and loss in realistic effects and/or to further enhance the cue of seeing a sky through a window. The artificial skylight may have the feature that the first baffle has an inner side that is (diffusely) reflective to limit efficiency loss, light source light reflected at said inner side of said first baffle contributes to the portion of diffused light issued from the cavity.

The base wall of the linear (rectangular) cavity may reflect or may emit bluish light to create a sky-like impression. More specifically, the linear light source typically, but not necessarily, is positioned under an angle at one side of the cavity ceiling to emit a linear light beam orthogonal to the length direction of the linear cavity. The nearest beam delimiter is the first baffle while the further beam delimiting element is formed by the second baffle, usually a second portion of the edge bordering the light exit window.

The elongated light source often is a linear light source and can be a fluorescent lamp, a solid state light emitter, but preferably is a LED based lamp, such as a LED retrofit TL, a LED strip or a LED filament. Such an elongated light source typically generates a beam of white light with a wide top beam angle, for example 120° full-width-at-half-maximum. Typically said light source is mounted in an angled position with respect to the side wall, such that a portion of the beam exits directly the cavity via the light exit window as directed collimated light, i.e. without impinging and being reflected by walls of the cavity. The collimation in this respect means that the original relatively wide top beam angle of the light as emitted by the light source, for example having a top angle of about 100°, is made smaller because of the delimitation in beam angle by the first and second baffle, for example the directed, collimated beam has a top beam angle of about 30°, such as about 20°. This directed, collimated beam is to be projected on a wall of a room and represents a beam of (artificial) sunlight, the projection on the wall having a sharp edge at its top and a less sharp edge at its bottom, as discussed above. Another portion of the beam does not exit the cavity of the light box through the light exit window directly, but rather impinges of walls of the cavity and is reflected by said walls before exiting as diffused light. The reflection at these walls provides the possibility to give the reflected light desired properties, for example the degree of diffusion of the reflected light, the intensity ratio of directed collimated light and (reflected) diffuse light by choosing the degree of absorption of light impinging on said walls, and/or rendering the (reflected) diffuse light to have specific (changed) spectral properties, for example in that the color of the (reflected) diffused light is somewhat bluish. The diffused light being somewhat bluish can simply be obtained by making the walls of the cavity, such as the base wall somewhat bluish reflective, which has the advantage that said (base) wall has the appearance of an infinite blue sky when a person would look through the light exit window into the cavity of the light box, rendering an improved sky-like impression. This contributes to the realistic effect of the artificial skylight. The bluish appearance of the base wall may, for example, be attained by the feature that the base wall is bluish reflective and/or is covered with a bluish, diffusive, translucent medium. Preferably, at least one of the interior surface of the cavity and the light source is or are configured such that the second light emitted elements, reflected by the interior surface of the cavity and subsequently being issued through the light exit window, is light for which at least 3% of the total luminous flux is in the wavelength range of 400 to 470 nm. Thereby, the degree of similarity of light emitted by the lighting device to a natural window or skylight and to that of a beam of sunlight may be increased.

The term “elongated” in the context of this invention means with respect to the light source that the light source has a length and a width (or diameter) in an aspect ratio of at least four, i.e. the length along the longitudinal axis is at least four times the width or diameter, for example said aspect ratio is at least ten, or at least twenty-five, or at least forty, such as for example at least hundred. Also a row of a plurality of light sources that seemingly forms a continuous single light source is considered a single light source in the context of this invention. Because of the aspect ratio, the light source may also be referred to as elongated light source and the artificial skylight may also be referred to as a (linear) lighting device. The invention underlying the claimed artificial skylight is based on the insight that for an artificial skylight with an elongated light source and elongated light box, a convincing effect may be achieved with a sharp beam definition in the transverse direction only. The required luminous flux may, for example, be generated by a single light source formed by a dense packing of LEDs along the length direction of the artificial skylight. This allows for a simple optical architecture enabling both high luminous flux and sharp beam cut-off of the projection of the directed collimated light of the artificial skylight on, for example, the wall of a room. Thus the artificial skylight as claimed may be used to obtain an artificial skylight/daylight or a natural window appearance.

The artificial skylight may have the feature that the first baffle is arranged in between the base wall and the light exit window. The sharpness of the bottom edge of the projected image by the directed light strongly depends on the mutual position of the first baffle and the light source and is thus a simple way to control both the top beam angle of the sunlight beam and the convincing, realistic effect thereof. This arrangement enables the first baffle to be shielded from direct view by users standing directly below the artificial skylight, for example in that the cavity near the base wall is wider than at the light exit window.

The artificial skylight may have the feature that a first edge portion of the side wall comprises the first baffle which borders the light exit window, rendering the artificial skylight of the invention even more simple and cheaper. This similarly applies for the artificial skylight wherein the second edge portion of the side wall comprises the second baffle which borders the light exit window.

The artificial skylight may have the feature that at least the first baffle is adjustable in orientation, size, and/or position. Dependent on the distance of the linear skylight to a wall and the height of the room, there may be the need to adjust the bottom beam cut-off during installation to a desired level, or to provide a dynamic projection image. This can be achieved by introducing mechanisms to move the linear baffle vertically or horizontally, or by enabling the baffle to rotate on a hinge. In all solutions a specific friction needs to be overcome for repositioning the baffle which enables adjusting the baffle with manual force, while after adjustment the baffle remains in its adjusted position. Repositioning of the baffle may even be based on actuation by electrical means (such as an electro-motor).

The current concept demonstrator creates a linear horizontal virtual sun beam on the wall which may be perceived as slightly artificial. In order to make the effect more natural, measures can be taken to make the beam asymmetrical. Hence, it could be desired to change the shape of the projection of the directed, collimated light beam on the wall of the room, for instance to provide the effect of sunlight beams entering the room at specific acute angles, which would be seen as a more or less trapezoidal projection. Thereto, the artificial skylight may have the feature that the first baffle is tapering in the longitudinal direction, i.e. in the direction of the longitudinal axis. Alternatively or additionally, this could be attained by the artificial skylight having the feature that the first baffle and the light source are mutually tilted in a direction perpendicular to the light exit window. The best is indeed to tilt both to keep shadow sharpness constant over the length, but alternatively, it is possible to tilt only one of those, for example only the light source. Additionally or alternatively, there may also be multiple separately activatable light sources, each having a different position and orientation, enabling activating the desired beam effect on the wall.

As already discussed before, the artificial skylight may have the feature that the light source is arranged to issue a first portion of light towards the light exit window to be issued therefrom as directed, collimated light and a second portion of light towards the base wall, said base wall being diffusely reflective and has a bluish color for converting said second portion of light into said diffuse, bluish colored light. Yet, alternatively or additionally the artificial skylight may have the feature that the directed, collimated light is provided via a specular reflection of light source light at a specular mirror arranged in the cavity and/or the artificial skylight may have the feature that diffused light is provided via diffuse reflection of light source light at at least the base wall of the cavity and/or via diffuse reflection at a diffuse mirror arranged in the cavity. These configurations could be considered a separate invention. The reflection via mirrors enables to reduce the vertical dimensions (height) of the device by folding the optical path. In this case, the linear light source could be positioned on top of the linear baffle shining upwards towards an angled linear mirror which reflects part of the light from the linear source. Alternatively, the elongated light source is at an angle while the elongated mirror is positioned horizontally. By using a mirror to fold the optical path of the collimated part of the beam, the distance between the first baffle and the base wall can typically be reduced by half, compared to the original situation. The other dimensions remain roughly the same. The dimension of the specular mirror is such that the specular mirror is not visible for a viewer standing underneath the artificial skylight and looking upwards. The angle of the specular mirror with respect to a horizontal plane can be in the range of 0° to 45°.

Instead of a single elongated light source to provide both the directed, collimated light and the diffuse light, the artificial skylight may have the feature that the light source is split into two light sources, referred to as sub light sources, and thereto comprises a first sub light source configured to provide the directed, collimated light, and a second sub light source configured to provide the diffused light. This has the advantage that the ratio between directed, collimated light and diffuse light is easily (dynamically) adjustable, and may, for example, be adjusted to the time of the day or weather conditions. The artificial skylight may have the feature that the second sub light source is mounted on top of the first baffle and directed towards the base wall (meaning that the average beam direction of the beam of light of the second sub light source is towards the base wall), and the first sub light source preferably being mounted at or near the base wall, for example closer to or within ¼ from the base wall of the spacing between the base wall and the first baffle, and directed towards the light exit window. In the case of the light source comprises, for example, a LED strip with addressable pixels, even more spatial dynamic effects can be generated mimicking the effect of clouds passing by. Dynamic effects can be created such that a dynamic "sky effect" is in sync with a dynamic "beam effect" in order to result in even more natural visual cues. In the case that multiple linear skylights are positioned next to each other or in the same room, the spatial, dynamic effects may be distributed over the devices based on their relative positions. The first and second sub light source are also referred to as sun light strip respectively sky light strip.

A discussed before, the diffused light can be diffuse bluish white light and contributes to the realistic effect of the artificial skylight. This diffuse bluish white light can be obtained by conversion of white light emitted by the light source in various ways. For this conversion into diffuse bluish white light, the artificial skylight may have the feature that said diffuse, bluish white light is provided by at least one of:

- the second sub light source being a uniform, diffuse bluish white light emitting light source, for example the second sub light source is embodied as a light tile, this could be indicated as an "active sky";
- the base wall being bluish reflective and/or being covered with a bluish translucent medium, for example such as a bluish reflective foil, plate or coating, this could be indicated as a "passive sky" and is a relatively cheap solution, yet causes some loss in efficacy;
- the second sub light source is arranged as a backlight source at the base wall behind a, diffusely translucent medium covering the base wall, wherein either the second sub light source is a uniform, diffuse bluish white light emitting light source and/or the diffusely translucent medium is bluish colored, this embodiment can also be indicated as an "active sky". In all the ways mentioned above, the base wall has the attractive appearance of a bluish colored (active or passive) sky.

In the case of an "active sky", the second sub light source can, for example, be an electronic display device rendering (dynamic) impressions of a sky with changing conditions such as moving clouds or flying birds and/or planes.

The artificial skylight may have the feature that the second sub light source is arranged as the backlight source at the base wall behind the diffusely translucent plate covering the base wall providing the blue sky effect, and wherein the first sub light source is arranged at the base wall next to the translucent plate and is configured to issue directed, collimated light towards the light exit window. It is important to note that the two light effects, "sun beam" (as provided by the directed, collimated light) and "sky" (as provided by the diffuse light and bluish appearance of the base wall) could influence each other. For instance, especially near the sky source the projected sunbeam will receive blueish light and appear less "warm". In a similar way, the rendered "blue sky" will receive "warm white" light from the "sun" light strip influencing the rendered light color of the sky impression, especially at the segment closest to the light strip. To account for those influences, the active sky light sources may take the current settings of the "sun" light strip into account and vice versa in order to compensate for those influences. Further, in case of an operation of the first and the second sub light source, the undesired effect of, for example, a (diffuse) reflection image of the first sub light source may be visible in said translucent plate. In that case it is beneficial to position the linear light source in a linear sub-cavity next to the translucent plate such that the (diffuse) reflection image of the first sub light source light cannot be formed and/or light from the first sub light source does not directly hit the base wall (which base wall acts as a sky surface). Hence, thus the undesired, mutual interference is counteracted.

The artificial skylight may have the feature that it comprises at least one further elongated light source configured to issue further light source light into the cavity of the elongated light box for subsequent emission to the exterior, both the light source and the further light source are arranged between the first baffle and the base wall, said further light source light being of a different, typically lower, color/color temperature than the color/color temperature of the light source light, and said further light source being arranged at a larger distance from the base wall than the light source. By arranging the further light source at a different height in between the first baffle and the base wall, the direction of the further directed, collimated light beam will be different from the direction of the directed, collimated light beam of the light source, thus various projections in different directions of said directed collimated light beam on the wall of a room are enabled because of different mutual positions of light source and first and second baffle. Optionally, when the angle x between a normal to the light exit window, here typically the direction of gravity when the artificial skylight is mounted at a ceiling, and a main beam propagation direction of the directed, collimated light beam is larger, the lower the color temperature (CT) or correlated color temperature (CCT), which matches with natural sunset and sunrise. In this way a more versatile mimicking of a realistic artificial skylight is provided. The further elongated light source may also comprise a further first sub light source and a further second sub light source, wherein, for example, the further second sub light source is a cool-white light strip mounted on top of the first baffle and directed to the base wall (thus for illuminating the base wall).

The artificial skylight may have the feature that the light source and the at least one further light source are individually controllable. Said individually controllable multiple activatable elongated light sources enable a gradual transition between multiple "sun beams". Hence, optionally the at least one further light source provides a warmer white light output than the light output of the light source to mimic sunrise or sunset at a larger angle with the direction of gravity. Both the light source and the further light source could comprise a first and second sub light source respectively a further first and second sub light source. Then, of the second sub light sources ("sky light strip"), both sky light strips can be individually controlled to mimic desired daylight and/or weather conditions. For instance, the first sub light source ("sun strip") can be dimmed while the "sky strip" is activated to mimic cloudy conditions. Furthermore, both the sun and sky light strips could be activated at low intensity while increasing the color temperature in order to mimic a sunrise impression.

The artificial skylight can be conveniently applied in a large variety of indoor spaces such as offices, hospitals, hospitality, schools, retail environments, etc.

BRIEF DESCRIPTION OF THE DRAWINGS

Exemplifying embodiments of the invention will be described below with reference to the accompanying drawings.

Figure 1:
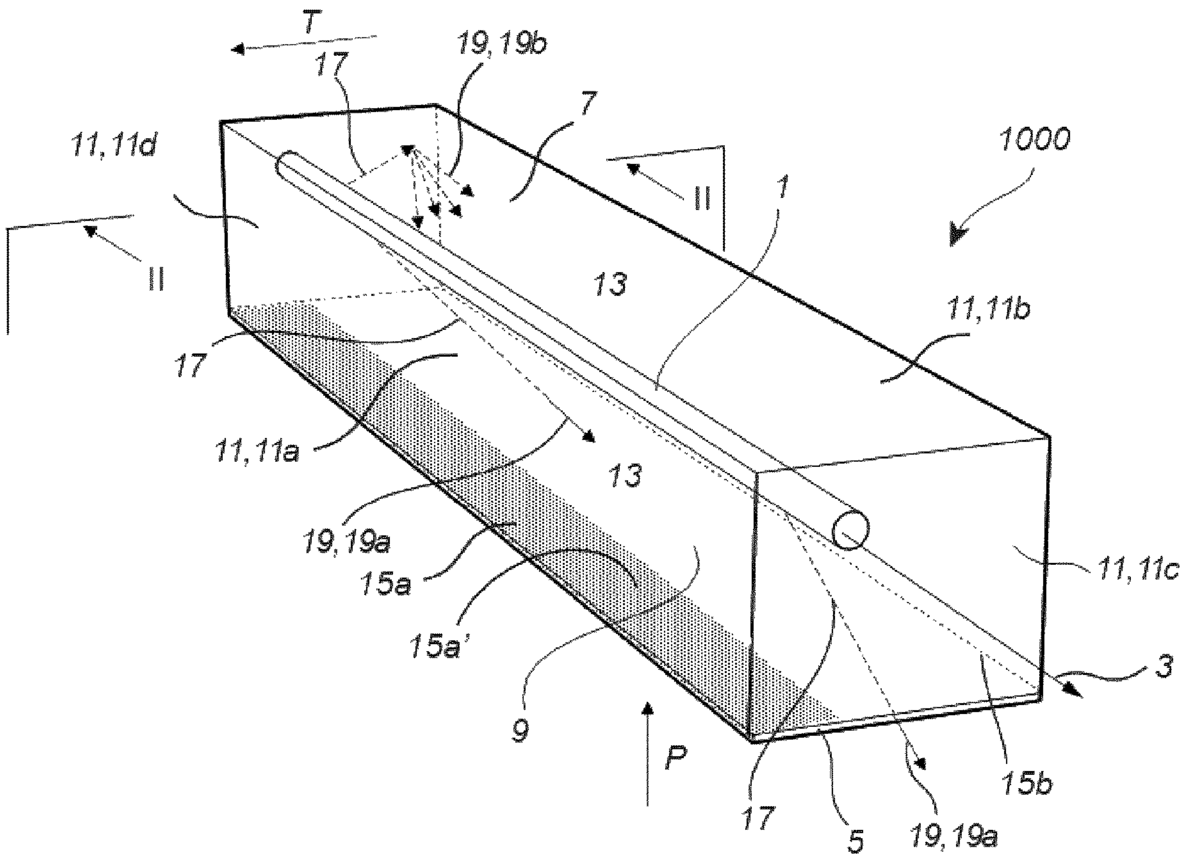
FIG. 1 is a schematic perspective view of an artificial skylight according to one or more exemplifying embodiments of the present invention.

All the figures are schematic, not necessarily to scale, and generally only show parts which are necessary in order to elucidate embodiments of the present invention, wherein other parts may be omitted or merely suggested.

DETAILED DESCRIPTION OF PREFERRED EMBODIMENTS

The present invention will now be described hereinafter with reference to the accompanying drawings, in which exemplifying embodiments of the present invention are shown. The present invention may, however, be embodied in many different forms and should not be construed as limited to the embodiments of the present invention set forth herein: rather, these embodiments of the present invention are provided by way of example so that this disclosure will convey the scope of the invention to those skilled in the art. In the drawings, identical reference numerals denote the same or similar components having a same or similar function, unless specifically stated otherwise.

FIG. 1 is a schematic perspective view of an artificial skylight according to one or more exemplifying embodiments of the present invention. The shown artificial skylight 1000 comprises an elongated light box 5, in the figure an elongated rectangular body. Said light box 5 comprises a base wall 7 and oppositely arranged thereto a light exit window 9. A circumferential side wall 11 of the light box bridges the distance between said base wall 7 and said light exit window 9, and mutually connects them. Said base wall 7 and said side wall 11 define a rectangularly shaped cavity 13 accommodating a light source 1, said light source 1 having a longitudinal axis 3. Said circumferential side wall 11 comprises a first 11*a* and second elongated, mutually opposed wall 11*b*, both extending along the longitudinal axis from a first end wall 11*c* to an opposed second end wall 11*d* of the circumferential side wall 11. The artificial skylight further comprises a first 15*a* and second baffle 15*b* extending along the longitudinal axis 3, and both being arranged at the light exit window 9. The first baffle 15*a* is arranged closer to the light source 1 than the second baffle 15*b*. The light source 1 is offset from a central position in the light box 5 in the transverse direction T such that in a direction P perpendicular to the light exit window 9 the light source 1 is screened from a direct view. Yet, the present inventive concept is not limited by the rectangular shape of the cavity 13 shown in FIG. 1. The shape of the cavity 13 may have any geometrical shape, such as for example a curved shape or shape comprising any number of sides, such as three, four, five, six, seven, eight, or more.

It is to be understood that the schematically shown light source 1 can, for example, be a fluorescent tube, a LED retrofit TL, a plurality of light emitting elements like halogen lamps or LEDs densely arranged in a row, a LED strip, or a LED filament. The light source is configured to issue light source light 17 into the cavity 13 of the elongated light box 5. Said light source light 17 subsequently is to be issued from the cavity 13 through the light exit window 9 of the light box 13 to the exterior as light box light 19. Said light box light comprises a portion of directed, collimated light 19*a* that exits the cavity 13 of the artificial skylight 1000 without impinging or being reflected at an (inner) side 15*a*' of the first baffle 15a, the side wall 11 or base wall 7 of the elongated light box 5. Said light box light further comprises a portion of diffused light 19b, which is a part of the light source light 17 that is (diffusely) reflected by the (inner) side 15a' of the first baffle 15a, the side wall 11 and/or base wall 7 of the elongated light box 5 before exiting the cavity 13 of the artificial skylight 1000 through the light exit window 9.

The directed collimated light 19a and diffuse light 19b may be of the same color, color temperature (CT) or correlated color temperature (CCT). Typically, the color of the diffuse light is slightly bluish and of a higher CT or CCT than the CT or CCT of the directed collimated light to better simulate day light. Typically, the color of the diffuse light is slightly yellow, orange or red and of a lower CT or CCT than the CT or CCT of the directed collimated light to better simulate sunset or sunrise light. Mostly the CT or CCT of the directed collimated light is in the range of 2000-10000K, for example at sunrise or sunset the CT or CCT is in the range of 2000-3000K, while during the day the CT or CCT is in the range of 3000K-10000K. Mostly, the CT or CCT of the diffuse light is in the range of 1500-20000K, for example at sunrise or sunset the CT or CCT is in the range of 1500-3000K, while during the day the CT or CCT is in the range of 3000K-20000K.

FIGS. 2A-J show schematic cross sections of various artificial skylights according to one or more exemplifying embodiments of the present invention. These cross-sections are typically taken according to II-II as shown in FIG. 1.

Figure 2A:
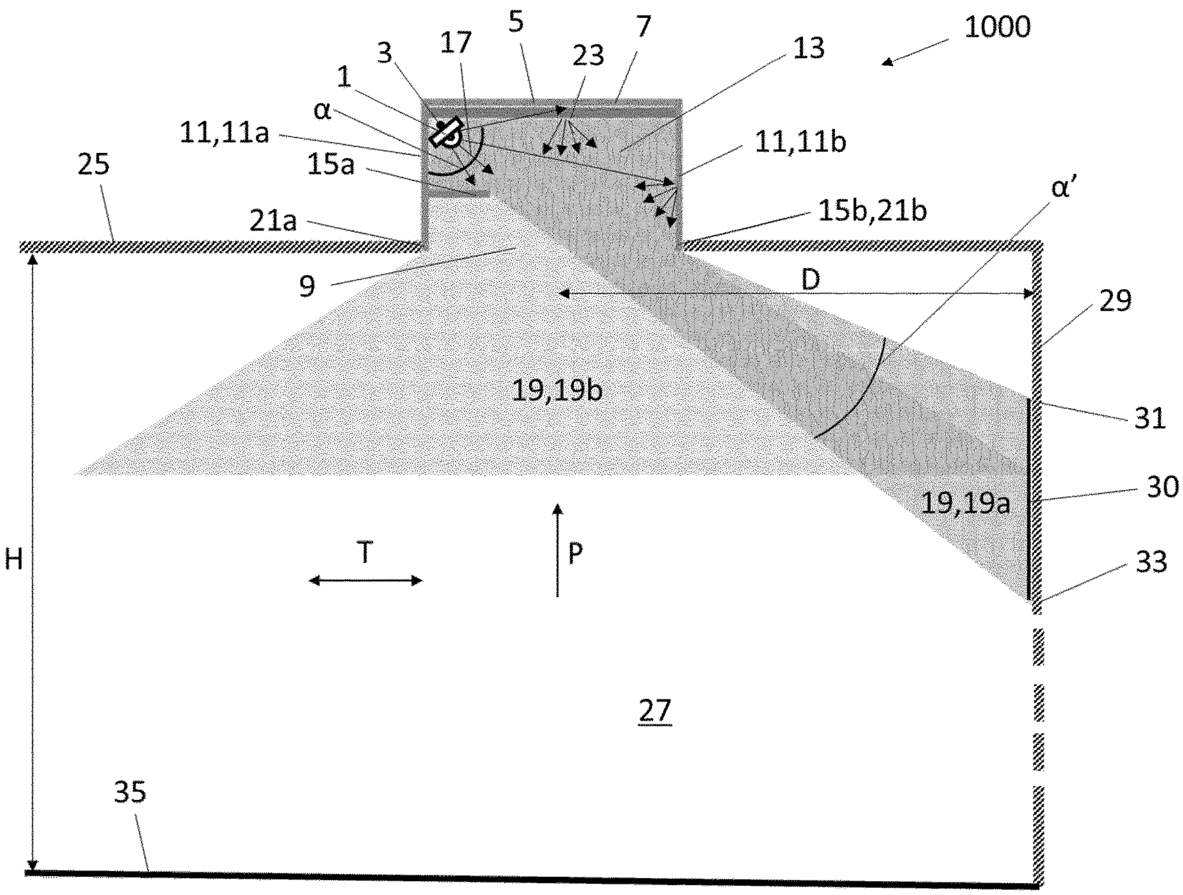
FIGS. 2A-J show schematic cross sections according to II-II of various artificial skylights according to one or more exemplifying embodiments of the present invention.

FIG. 2A shows a first embodiment of an artificial skylight 1000 according to the invention mounted in a ceiling 25 of a room 27 at a distance D from a room wall 29, said distance D being in the range of a half to one fifth, typically about one third, of the height H at which the artificial skylight is mounted in said room from room floor 35. The shown artificial skylight 1000 comprises an elongated light box 5. Said light box 5 comprises a base wall 7 and oppositely arranged thereto a light exit window 9. A circumferential side wall 11 of the light box bridges the distance between said base wall 7 and said light exit window 9, and mutually connects them. Said base wall 7 and said side wall 11 define a cavity 13 accommodating a light source 1, said light source 1 having a longitudinal axis 3. Said circumferential side wall 11 comprises a first 11a and second elongated, mutually opposed wall 11b, both extending along the longitudinal axis 3. The artificial skylight further comprises a first 15a and second baffle 15b extending along the longitudinal axis 3, the second baffle 15b being arranged at the light exit window 9 and forms a second edge portion 21b bordering the light exit window 9. The first baffle 15a is arranged in between the base wall 7 and a first edge portion 21a of the light exit window 9, closer to the light source 1 than the second baffle 15b. The light source 1 is offset from a central position in the light box 5 in the transverse direction T and arranged in a corner between the base 7 and the first wall 11a, such that in a direction P perpendicular to the light exit window 9 the light source 1 is screened from a direct view.

The light source 1 provides light source light 17 in beam with a FHWM beam angle α in a transverse direction T transverse to the longitudinal axis 3 of about 100°. A portion of the light source light 17 impinges on the base wall 7, which is provided with a translucent medium 23 of bluish color, in the figure a coating, and is converted into bluish light box light 19 by being diffused by reflection at said base wall 7 and exits the artificial skylight 1000 as diffused light box light 19b. Another portion of the light source light 17 is directed at the light exit window 9 and is collimated by the first and second baffle, and exits the artificial skylight 1000 as directed collimated light box light 19a, having a beam angle α' in the range of 10° to 45°, in the figure of about 20°. Said directed, collimated light box light 19a is projected as a projection image 30 on the room wall and has a relatively sharp top projection edge 31 and a relatively diffuse bottom projection edge 33.

Figure 2B:
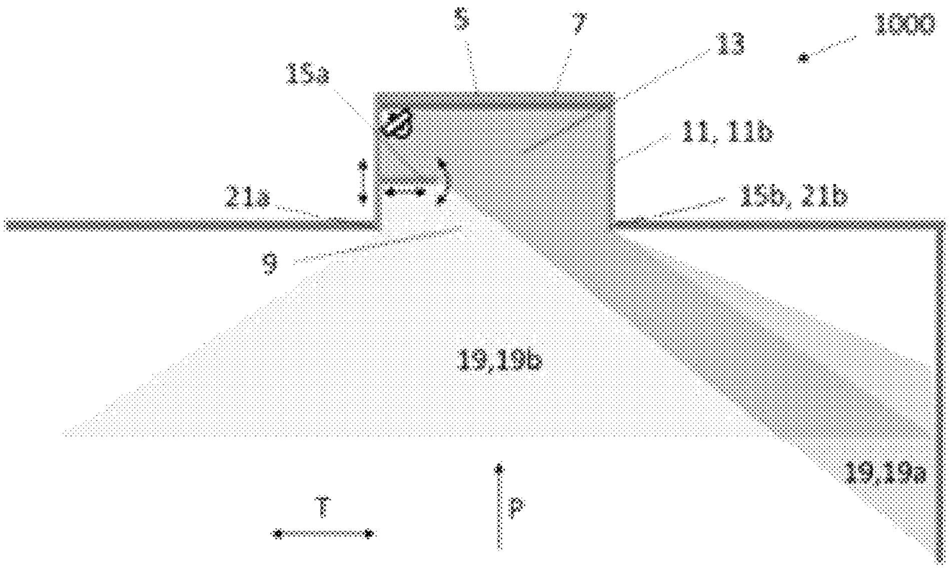

FIG. 2B shows cross section of a second embodiment of an artificial skylight 1000, similar to the first embodiment in FIG. 2A, wherein the second embodiment the first baffle 15a is adjustable in orientation, size, and/or position, as indicated by the arrows at the first baffle 15a.

Figure 2C:
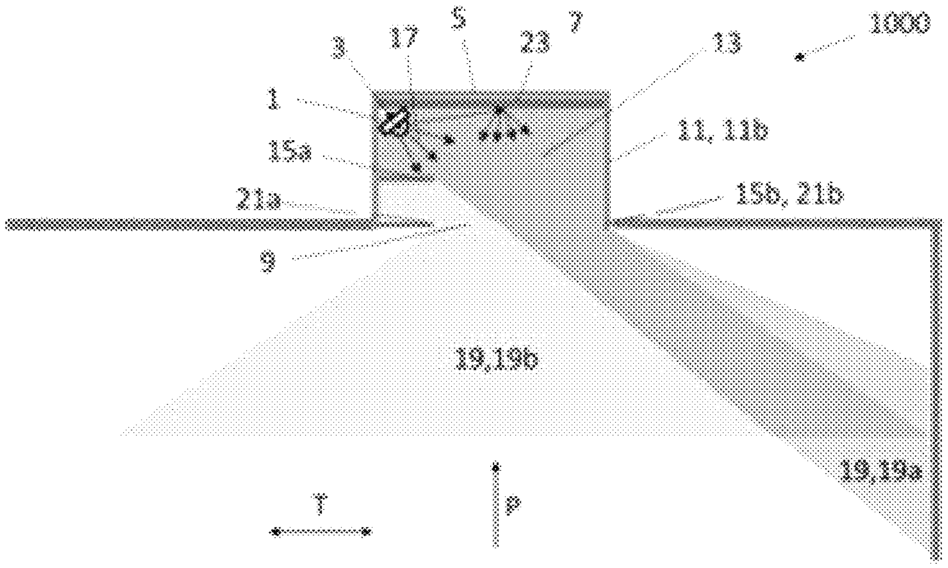

FIG. 2C shows cross section of a third embodiment of an artificial skylight 1000, similar to the first embodiment in FIG. 2A wherein the first baffle 15a for beam collimating is hidden by narrowing the light exit window 9 via an extended first edge 21a of the light exit window 9 which functions as an additional baffle.

Figure 2D:
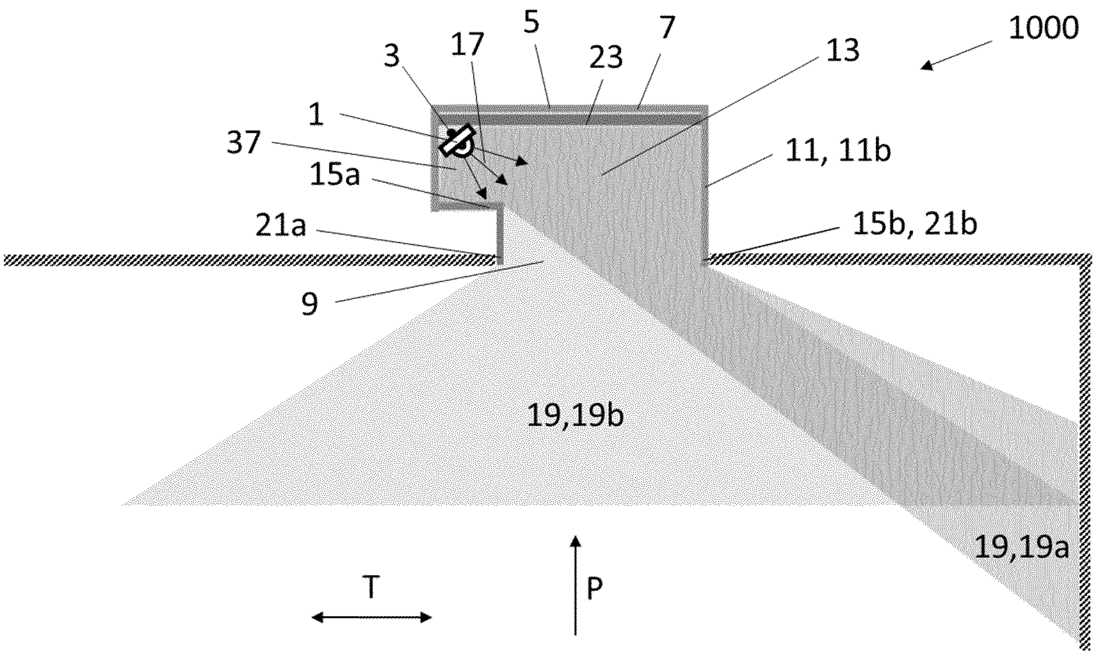

FIG. 2D shows cross section of a fourth embodiment of an artificial skylight 1000, similar to the first embodiment in FIG. 2A wherein the first baffle 15a for beam collimating is hidden by narrowing the light exit window 9 by realizing a side cavity 37 accommodating the first baffle 15a and the elongated light source 1, such that the base wall 7 of the cavity 13 is wider than the light exit window 9.

Figure 2E:
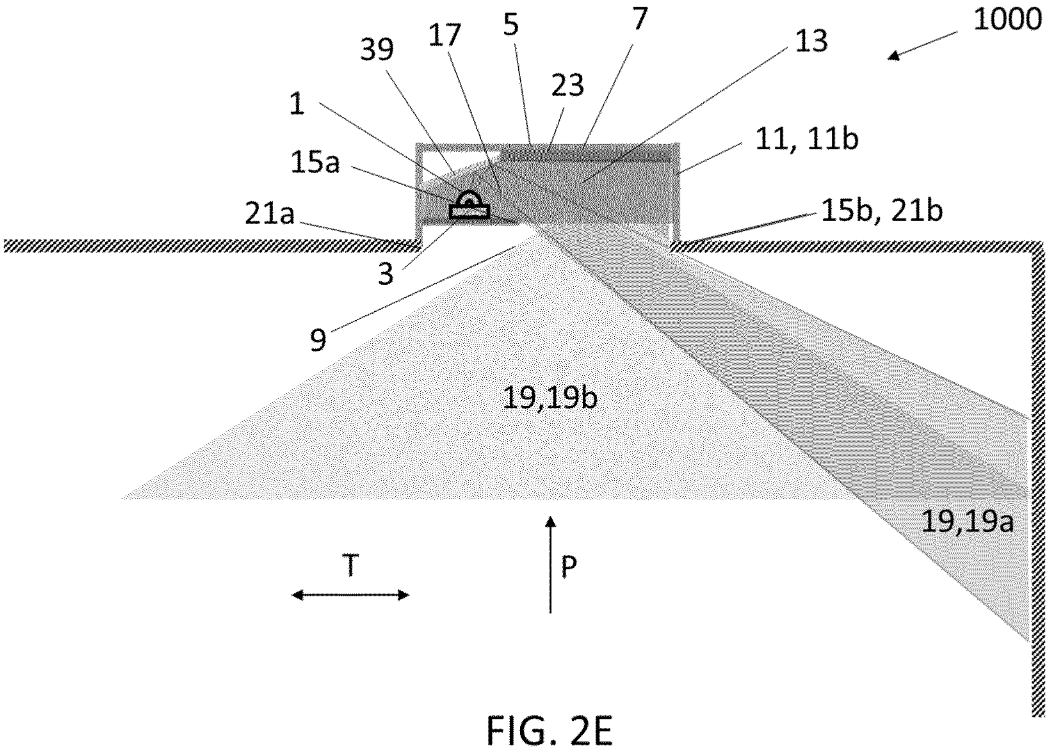

FIG. 2E shows cross section of a fifth embodiment of an artificial skylight 1000, similar to the first embodiment in FIG. 2A wherein the directed, collimated light box light 19a is provided via a specular reflection of light source light 17 at a specular mirror 39 arranged in the cavity 13.

Figure 2F:
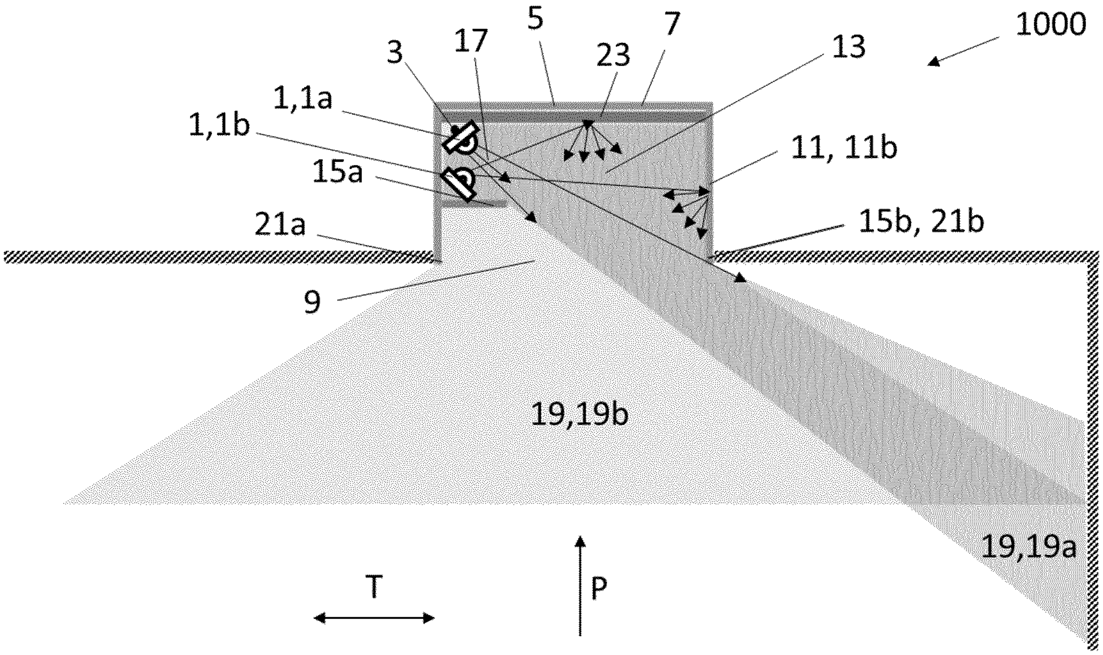

FIG. 2F shows cross section of a sixth embodiment of an artificial skylight 1000, similar to the first embodiment in FIG. 2A wherein the light source 1 comprises a first sub light source 1a configured to provide the directed, collimated light 17,19a, and a second sub light source 1b configured to provide the diffused light 17,19b. The second sub light source 1b is mounted on top of the first baffle 15a and directed towards the base wall 7, the first sub light source 1a is directed towards the light exit window 9 and is mounted at the base wall 7.

Figure 2G:
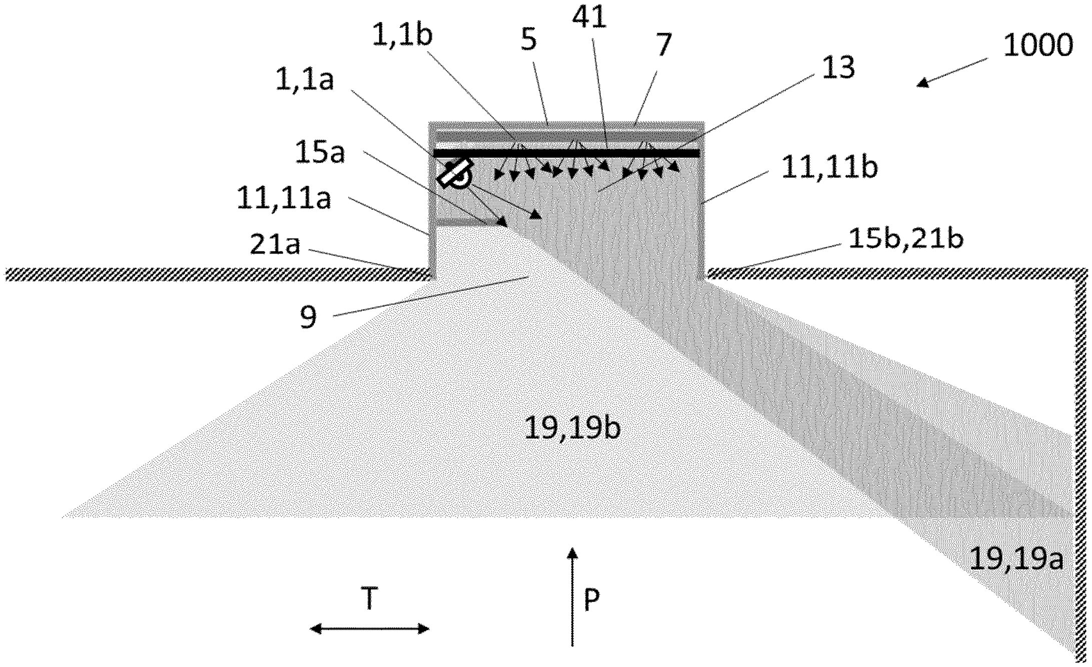

FIG. 2G shows cross section of a seventh embodiment of an artificial skylight 1000, similar to the sixth embodiment in FIG. 2F wherein the second sub light source 1b is a backlight mounted in between the base wall 7 and a bluish, diffusely translucent plate 41 as the translucent medium 23 and is directed towards the light exit window 9. The first sub light source 1a is directed towards the light exit window 9 and is mounted at the first side wall 11a, in between the first baffle 15a and adjacent the base wall 7.

Figure 2H:
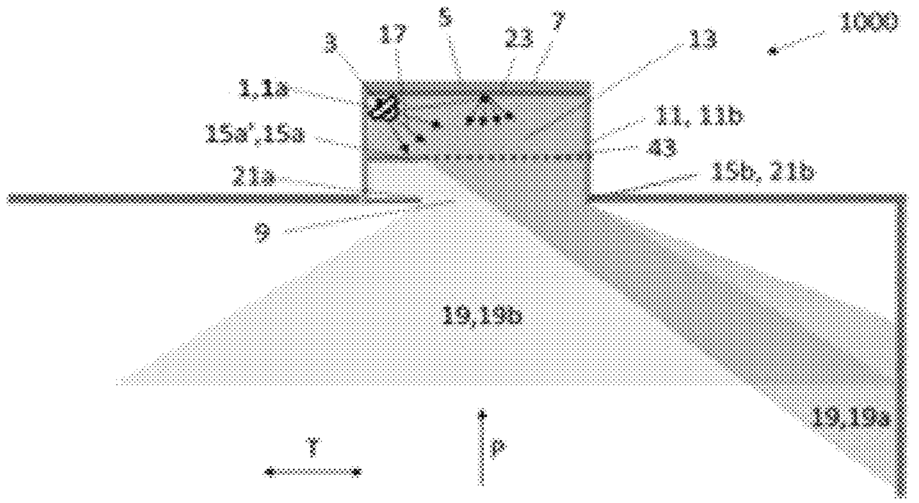

FIG. 2H shows cross section of an eight embodiment of an artificial skylight 1000, similar to the first embodiment in FIG. 2c wherein the first baffle 15a is extended with a colorless transparent plate 43 to the second elongated wall 11b of the light box 5.

Figure 2I:
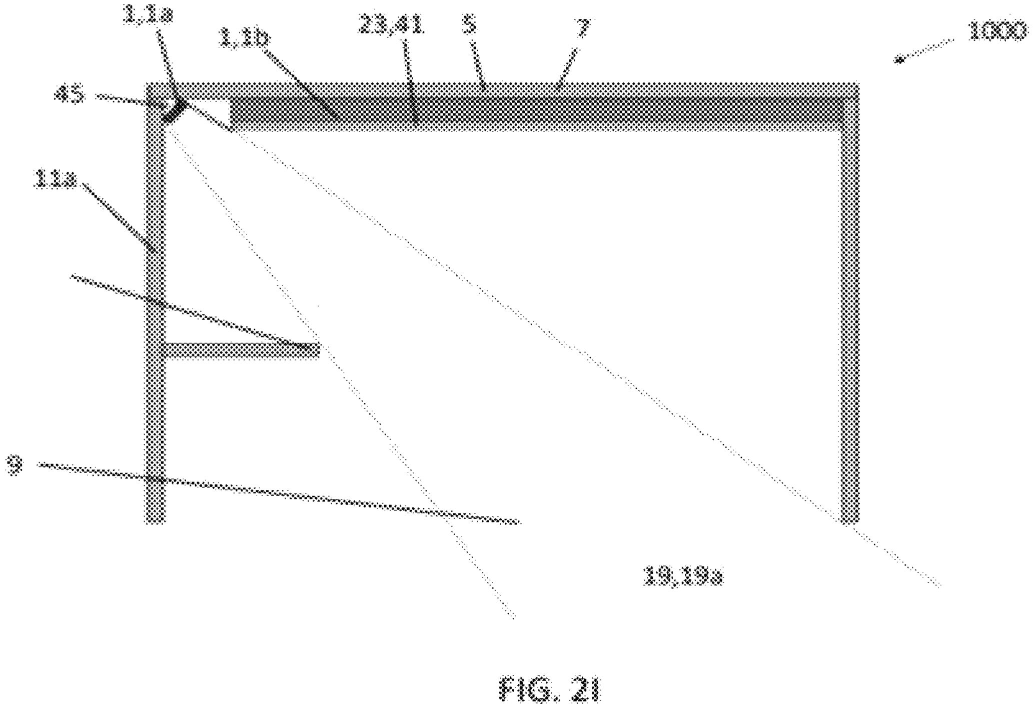

FIG. 2I shows cross section of a ninth embodiment of an artificial skylight 1000, wherein a second sub light source 1b, emitting bluish white light during operation, is arranged as the backlight source at the base wall 7 behind a diffusely translucent plate 41 covering the base wall almost completely. A first sub light source 1a is arranged in a corner 45 of the light box 5 at the base wall 7 and first elongated wall 11a, next to the translucent plate and backlight source 1b. The first sub light source 1a is configured to issue directed, collimated light towards the light exit window 9. Light from the first sub light source 1a that impinges on an inner side 15a' of the first baffle 15a is diffusely reflected and contributes to the portion of diffuse light 19b issued from the cavity 13.

Figure 2J:
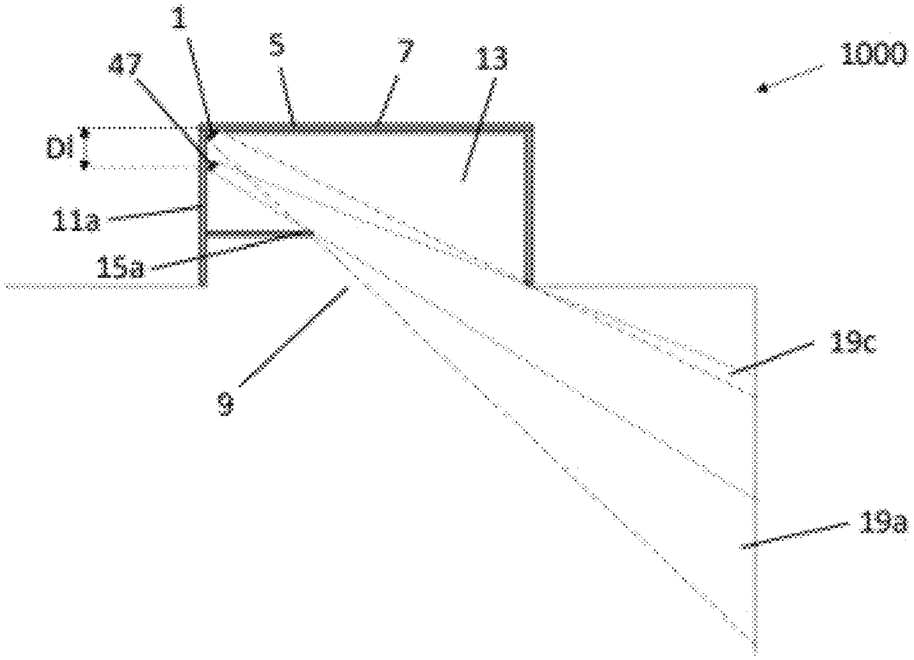

FIG. 2J shows cross section of a tenth embodiment of an artificial skylight 1000 comprising a light source 1 and at least one further light source 47. Both the light source 1 and the further light source 47 are arranged between the first baffle 15*a* and the base wall 7 at the first elongated wall 11*a*. The further light source 47 is configured to issue further light source light 19*c* into the cavity 13 of the elongated light box 5 for subsequent emission through the light exit window 9 to the exterior. Said further light source light 19*c* being of a different, here a lower, color/color temperature than the color/color temperature of the light source light 19*a* issued by the light source 1, and said further light source 47 being arranged at a larger distance D1 from the base wall 7 than the light source 1.

Figure 3A:
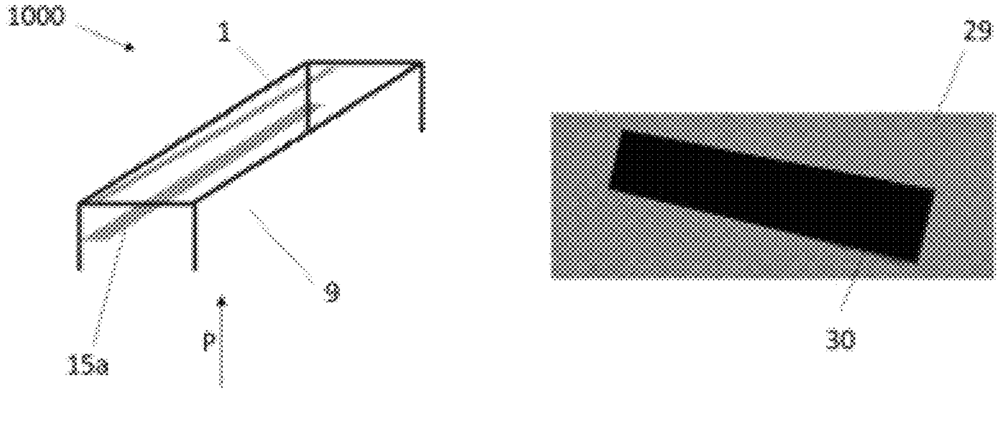
FIGS. 3A-B are schematic perspective views of artificial skylights according to embodiments of the present invention and their generated projection images.
Figure 3B:
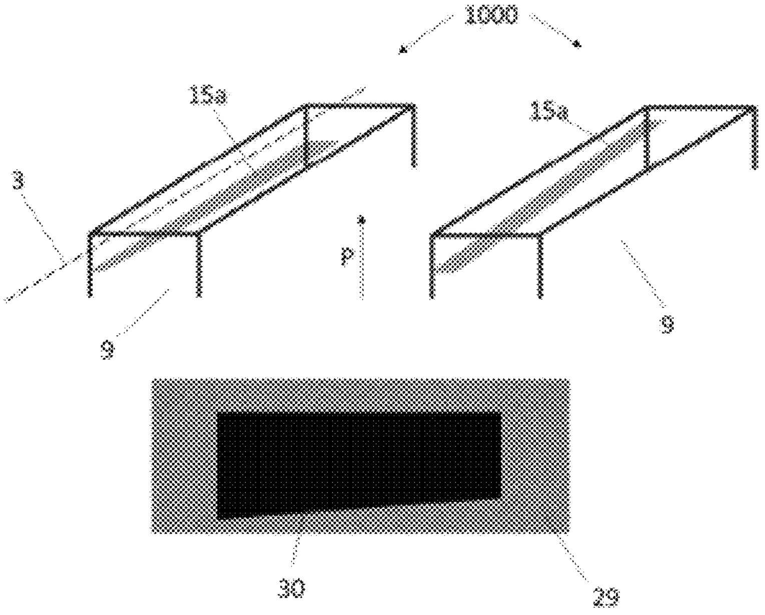

FIGS. 3A-B are schematic perspective views of artificial skylights 1000 according to embodiments of the present invention and their generated projection images on a wall of a room. In FIG. 3A the first light source 1 is tilted in a direction P perpendicular to the light exit window 9 and the first baffle 15*a*, rendering a tapering beam projection image 30 on the wall 29 of a room during operation of the artificial skylight 1000. In FIG. 3B the first baffle 15*a* is either tilted in a direction P perpendicular to the light exit window 9 and/or the first baffle 15*a* is tapering along the longitudinal axis 3, rendering a tapering beam projection image 30 on the wall 29 of a room during operation of the artificial skylight 1000.

The invention claimed is:

1. An artificial skylight comprising:

an elongated light source having a longitudinal axis;

an elongated light box comprising a base wall and oppositely arranged thereto a light exit window mutually connected by a circumferential side wall of the light box, said base wall and said side wall defining a cavity accommodating the light source, said circumferential side wall comprising a first and second elongated, mutually opposed wall and extending along the longitudinal axis from a first end wall to an opposed second end wall of the circumferential side wall;

a first and second baffle extending along the longitudinal axis;

wherein the light source is configured to issue light source light into the cavity of the elongated light box, said light source light subsequently is to be issued from the cavity through the light exit window of the light box as light box light to the exterior, said light box light comprising a portion of directed, collimated light and a portion of diffused light, wherein the collimated light has a beam angle $\alpha$ in a transverse direction T transverse to the longitudinal axis, which beam angle $\alpha$ is only determined by the mutual positions of the light source and the first and second baffle), wherein the first baffle is arranged closer to the light source than the second baffle, wherein the first baffle is arranged in between the base wall and the light exit window, and wherein the first baffle has an inner side for reflecting light source light, and wherein the light source is offset in the transverse direction T such that in a direction P perpendicular to the light exit window the light source is screened from a direct view, and wherein at least the first baffle is adjustable in orientation, size, and/or position and/or wherein the first baffle is tapering in the direction along the longitudinal axis.

2. The artificial skylight as claimed in claim 1, wherein the light exit window is free from optical elements.

3. The artificial skylight as claimed in claim 1, wherein a first edge portion of the side wall comprises the first baffle which borders the light exit window.

4. The artificial skylight as claimed in claim 1, wherein a second edge portion of the side wall comprises the second baffle which borders the light exit window.

5. The artificial skylight as claimed in claim 1, wherein the base wall is bluish reflective and/or is covered with a, diffusive, translucent medium of bluish color.

6. The artificial skylight as claimed in claim 1, wherein the first baffle is arranged at the first elongated wall of the light box and is extended with a transparent plate extending to the second elongated wall of the light box.

7. The artificial skylight as claimed in claim 1, wherein the first baffle and the light source are mutually tilted in a direction P perpendicular to the light exit window.

8. The artificial skylight as claimed in claim 1, wherein the light source comprises a first sub light source configured to provide the directed, collimated light, and a second sub light source configured to provide the diffused light.

9. The artificial skylight as claimed in claim 8, wherein the second sub light source is mounted on top of the first baffle and directed towards the base wall, the first sub light source is directed towards the light exit window and is mounted closer to the base wall than to the first baffle or is mounted at the base wall.

10. The artificial skylight as claimed in claim 9, wherein said diffused light is diffuse, bluish light, wherein said diffuse bluish light is either provided by at least one of:

the second sub light source being a uniform, diffuse bluish light emitting light source;

the base wall being bluish reflective and/or being covered with a bluish translucent medium;

the second sub light source is arranged as a backlight source at the base wall behind a, diffusely translucent medium covering the base wall, wherein either the second sub light source is a uniform, diffuse bluish light emitting light source and/or the diffusely translucent medium is bluish colored.

11. The artificial skylight as claimed in claim 9, wherein the second sub light source is arranged as the backlight source at the base wall behind a diffusely translucent plate covering the base wall, and wherein the first sub light source is arranged at the base wall next to the translucent plate and is configured to issue directed, collimated light towards the light exit window.

12. The artificial skylight as claimed in claim 1, comprising at least one further elongated light source configured to issue further light source light into the cavity of the elongated light box for subsequent emission to the exterior, both the light source and the further light source are arranged between the first baffle and the base wall, said further light source light being of a different color/color temperature than the color/color temperature of the light source light, and said further light source being arranged at a larger distance D1 from the base wall than the light source.

13. The artificial skylight as claimed in claim 12, wherein the light source and the at least one further light source are individually controllable.

14. An artificial skylight comprising:

an elongated light source having a longitudinal axis;

an elongated light box comprising a base wall and oppositely arranged thereto a light exit window mutually connected by a circumferential side wall of the light box, said base wall and said side wall defining a cavity accommodating the light source, said circumferential side wall comprising a first and second elongated, mutually opposed wall and extending along the longitudinal axis from a first end wall to an opposed second end wall of the circumferential side wall;

a first and/or a second baffle extending along the longitudinal axis;

wherein the light source is configured to issue light source light into the cavity of the elongated light box, said light source light subsequently is to be issued from the cavity through the light exit window of the light box as light box light to the exterior, said light box light comprising a portion of directed, collimated light and a portion of diffused light, wherein the first baffle is arranged in between the base wall and the light exit window, and wherein the first baffle has an inner side for reflecting light source light, and wherein the light source is offset in the transverse direction such that in a direction perpendicular to the light exit window the light source is screened from a direct view, and wherein at least the first baffle is adjustable in at least one of orientation, size, position and/or tapering in the direction along the longitudinal axis.

* * * * *